United States Patent

Herbster et al.

(10) Patent No.: US 6,370,464 B1
(45) Date of Patent: Apr. 9, 2002

(54) AUTOMATIC GEARBOX WITH A DOWNSHIFT FUNCTION

(75) Inventors: Kai-Uwe Herbster, Friedrichshafen; Franz-Josef Schuler, Kressbronn, both of (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/555,698

(22) PCT Filed: Dec. 7, 1998

(86) PCT No.: PCT/EP98/07928

§ 371 Date: Jun. 1, 2000

§ 102(e) Date: Jun. 1, 2000

(87) PCT Pub. No.: WO99/29532

PCT Pub. Date: Jun. 17, 1999

(30) Foreign Application Priority Data

Dec. 11, 1997 (DE) .......................... 197 55 076

(51) Int. Cl.$^7$ .................. G06F 17/00; B60K 17/00; B60K 41/26; B60K 41/12
(52) U.S. Cl. .................. 701/55; 180/337; 192/215; 477/39
(58) Field of Search ............... 701/51, 55–58, 701/65; 180/337–338, 370; 192/215, 218–219; 477/34, 37–43, 70–71, 115, 140, 144, 145, 148

(56) References Cited

U.S. PATENT DOCUMENTS

| | | | | |
|---|---|---|---|---|
| 5,113,721 A | * | 5/1992 | Polly | 74/866 |
| 5,287,773 A | | 2/1994 | Nakawaki et al. | 74/859 |
| 5,474,508 A | * | 12/1995 | Kondo et al. | 477/143 |
| 5,531,654 A | * | 7/1996 | Ishikawa et al. | 477/120 |
| 5,921,889 A | * | 7/1999 | Nozaki et al. | 477/158 |

FOREIGN PATENT DOCUMENTS

| | | |
|---|---|---|
| DE | 31 39 985 A1 | 2/1983 |
| DE | 39 41 999 A1 | 6/1991 |
| DE | 40 31 019 A1 | 4/1992 |
| DE | 39 22 051 C2 | 7/1993 |
| DE | 44 46 111 A1 | 7/1995 |
| GB | 2 282 861 A | 4/1995 |

* cited by examiner

Primary Examiner—William A. Cuchlinski, Jr.
Assistant Examiner—Thu Nguyen
(74) Attorney, Agent, or Firm—Davis & Bujold, P.L.L.C.

(57) ABSTRACT

For an automatic transmission (3) a downshift function is proposed in which, with the actuation of a brake pedal, a new downshift point (RA(NEU)) is calculated when the throttle valve is closed by adding to a basic downshift point (RS(ORD)) a characteristic variable (K1) wherein the characteristic variable (K1) is determined from a driving activity (FA) and a calculated brake pressure via a characteristic field.

6 Claims, 4 Drawing Sheets

AUTOMATIC GEARBOX WITH A DOWNSHIFT FUNCTION

The invention relates to a process for control of an automatic transmission in which a downshift function is initiated with the actuation of a brake pedal.

BACKGROUND OF THE INVENTION

A problem arises in automatic transmissions when, due to the increasing speed of the vehicle from downhill driving, upshifts are effected. This impairs the braking action of the motor. It is known from the prior art to suppress the upshifts. For example, DE-OS 31 39 985 proposes a process in which the reduction ratio of the automatic transmission is increased depending on the actuation of a brake pedal. It is, alternatively, proposed that the reduction ratio be adjusted so that the driving speed remains constant.

The invention solves the problem based on further development of the above described prior art.

SUMMARY OF THE INVENTION

According to the invention, the problem is solved by calculating in an initial downshift function a new downshift point, from a basic downshift point and a characteristic value K1. The characteristic value K1, in turn, is calculated from a driving activity and a calculated brake pressure. The brake pressure is calculated from the difference between an actual gradient and an imaginary gradient of the transmission output rotational speed. The imaginary gradient of the transmission output rotational speed is, in turn, determined by a characteristic field which represents a function of the vehicle speed and a torque reserve. The torque reserve is determined from the torque generated by the internal combustion engine and the resistance torques.

The inventive solution and developments thereof offer the advantage that the downshift function is better adapted to the environmental conditions. The torque reserve characterizes the road inclinations and, driving activity by the driver's behavior, Since in the new generation of automatic transmissions with intelligent shift programs, shift points are selected depending on a driving activity, the inventive solution can thus refer to the already detected driving activity. The driving activity can be determined by a method, such as known from German Patent No. 39 22 051 (corresponding to U.S. Pat. No. 5,157,609) or DE-OS 39 41 999. According to German Patent No. 39 22 051 (U.S. Pat. No. 5,157,609), in which the driving speed, latest acceleration, longitudinal acceleration and deceleration, plus engine rotational speed, and throttle position are measured. These measurements being added together using a characteristic diagram and a linking function to form a parameter, can be further interpolated by filtering out a value for a driving activity. Said driving activity value is then used for the selection of a shifting program from a plurality of shifting programs ranging from a consumption-optimized program to a power-optimized program. Since in the new generation of automatic transmissions with intelligent shift programs, shift points are selected depending on the driving activity, the inventive solution can thus refer to the already detected driving activity. The inventive solution can be advantageously and economically integrated in existing software.

The downshift function terminates when the driver releases the brake pedal, the throttle valve value is higher than a minimum value, and a first delay time has elapsed. The minimum value is determined by a traction-push characteristic line. This development takes into account, e.g. the case at the end of an incline that the driver again communicates, via the throttle valve, a normal performance requirement.

In case of a significant change of the throttle valve signal evidenced by a large gradient during a first delay time, a second delay time is started when the significant change no longer exists and the downshift function terminates when the second delay time has expired. This development takes into account the case that, during the first delay time, the driver quickly actuates the acceleration pedal and then holds it constant. Accordingly, the downshift function terminates only with the expiration of the second delay time.

It is proposed that the second delay time again be started when the throttle valve is again actuated or the throttle valve gradient exceeds the limit value. The downshift function is then terminated independently of the further curve of the throttle valve when the second delay time has expired.

BRIEF DESCRIPTION OF THE DRAWINGS

A preferred embodiment is shown in the drawings. The drawings show.

DESCRIPTION OF THE PREFERRED EMBODIMENTS

Figure 1:
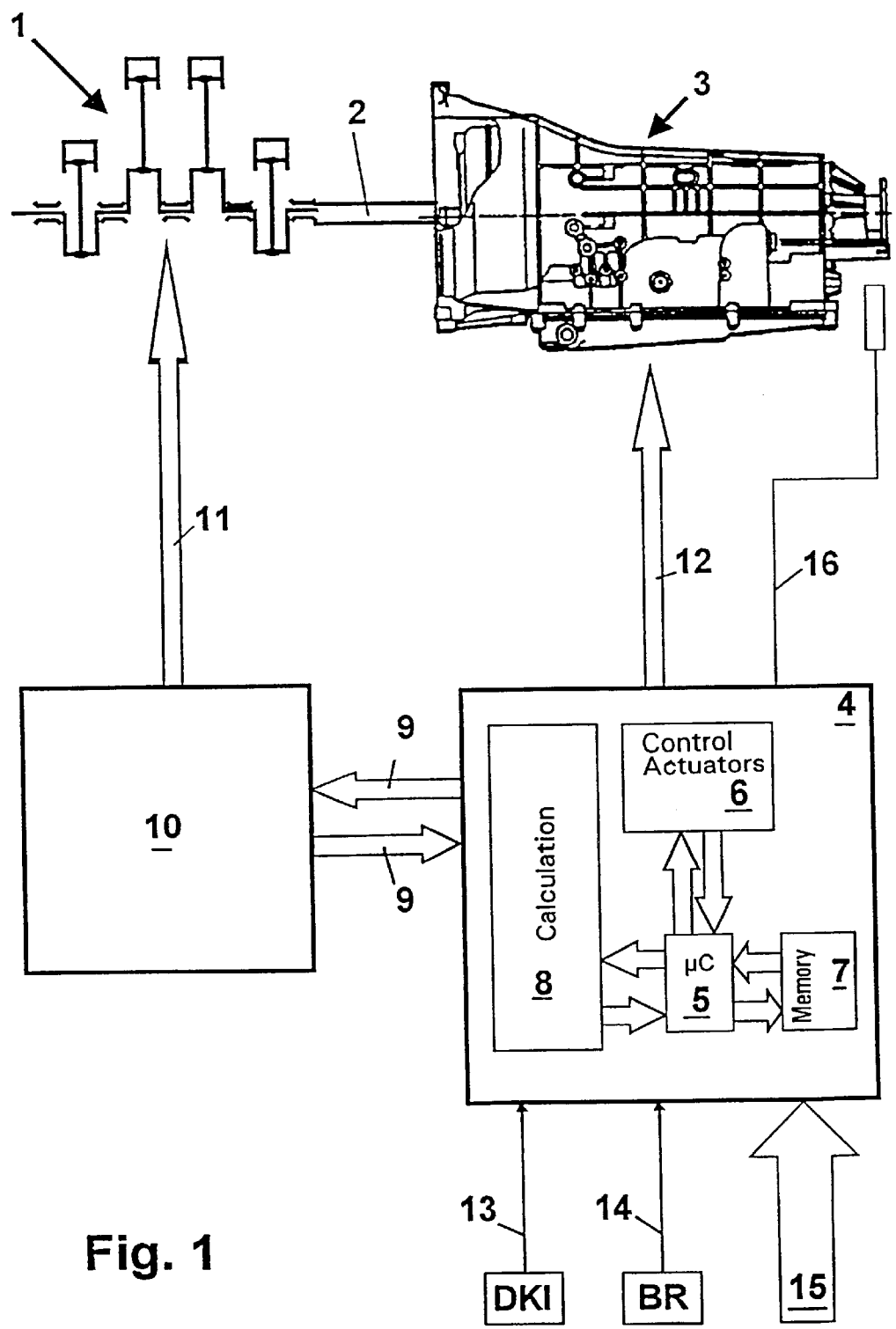
FIG. 1 is a system diagram.

FIG. 1 shows a system diagram of an internal combustion engine/ automatic transmission unit. It consists of the internal combustion engine 1, the automatic transmission 3, an electronic transmission control 4 and an electronic engine control unit 10 which controls the internal combustion engine 1, via control lines 11. Internal combustion engine 1 and automatic transmission 3 are mechanically interconnected by an input shaft 2. The electronic engine control unit 10 and the electronic transmission control 4 are interconnected by data lines 9, Both control units communicate via the data lines, e.g. by means of a CAN bus. On the data lines, the electronic motor control unit 10 makes available the following information: torque of the internal combustion engine MM, rotational speed of the internal combustion engine nMOT, temperature of the coolant fluid of the internal combustion engine, etc. The electronic transmission control 4 makes available information on the data lines 9, e.g. the beginning and the end of a shift, the so-called engine engagement or a set motor torque.

Depending on other input variables 13 to 16, the electronic transmission control 4 selects an adequate driving step or a shift program. The electronic transmission control 4 then activates, via control line 12, an adequate clutch/brake combination via a hydraulic control unit which is an integral part of the automatic transmission 3 and where electromagnetic actuators are located. Of the electronic transmission control 4, there are shown as blocks in extensively simplified manner: micro-controller 5, memory 7, function block control actuators 6 and function block calculation 8. In the memory 7 are stored data relevant to the transmission. Data relevant to the transmission include programs shifting characteristic lines, characteristic fields, characteristic values specific to the vehicle and also diagnosis data. The memory 7 is usually designed as EPROM, EEPROM or as buffered RAM. In function block calculation 8 are calculated data relevant for the operation of the automatic transmission 4, e.g. the pressure level, driving activity, etc. The function block control actuators 6 serves for control of the actuators located in the hydraulic control unit.

Reference numeral 13 designates a signal for throttle valve information DKI; reference numeral 14, the signal of the brake pedal BR and reference numeral 16, the signal of the transmission output rotational speed. As an obvious alternative to throttle valve information DKI, an accelerator pedal position, presettable by the driver, can also be used as an input variable.

Reference numeral 15 designates other input variables of the electronic transmission control 4, such as selector lever position, transmission input rotational speed, temperature of the ATF (automatic transmission fluid), etc.

Figure 2:
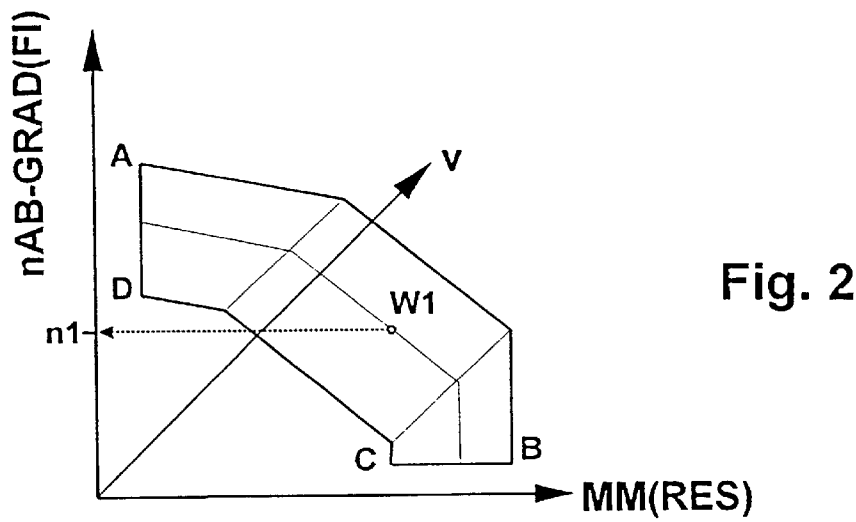
FIG. 2 is a first characteristic field.

In FIG. 2 is shown a first characteristic field, Input variables are a torque reserve (MM(RES) and the vehicle speed (v). The output variable of the characteristic field is an imaginary gradient of the transmission output rotational speed nAB-GRAD(FI). The torque reserve is calculated from the torque MM generated by the internal combustion engine 1 and the resistance torques (M(WI) and MM(RES), where MM(RES)=MM−M(WI), The variable torque reserve MM(RES) characterizes the road inclination. In the characteristic field is spread out a surface with the joints A to D. As example is plotted on the surface a point W1. The latter is determined by finding from both the determined torque reserve MM(RES), and the vehicle speed (v), an intersection point and projecting it on the surface. A value n1 results as the output variable for the value W1, as shown. From the imaginary gradient of the transmission output rotational speed nAB-GRAD (FI), corresponding to value n1, and the actual gradient nAB-GRAD (IST) determined from the measured transmission output rotational speed 16, a normalized brake pressure is calculated according to the following equation:

$$pBR=K((nAB-GRAD(FI)-(nAB-GRAD\ (IST))$$

K: conversion factor
nAB-GRAD(FI): imaginary gradient of the transmission output rotational speed;
nAB-GRAD(IST): actual gradient of the transmission output rotational speed.

Figure 3:
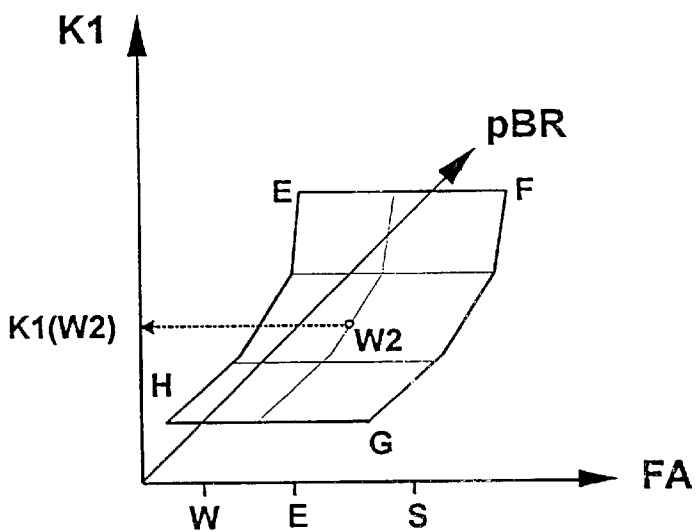
FIG. 3 is a second characteristic field.

In FIG. 3 is shown a second characteristic field. Input variables are driving activity FA and the previously calculated brake pressure pBR. A characteristic variable K1 is the output variable. In the characteristic field is spread out a surface with the joints E to H. As an example is plotted in the surface a point W2. The latter results from the intersection point of the actual driving activity FA, the brake pressure pBR, and of the projection on the surface. The operation point W2 yields as output variable the value K1(W2), as shown in FIG. 3. The driving activity can be determined by a method such as disclosed in German Patent No. 39 22 051 or DE-OS 39 41 999, The inventive process can obviously be used also in conventional automatic transmissions. In these, the driver can select, via a program selector switch, from three driving programs, usually designated as "E"(economy), "S"(,port) and "W"(winter). These cases are plotted in FIG. 3 on the abscissa as alternatives to the driving activity, three constant values "W", "E" and "S" corresponding to the driving programs.

Figure 4:
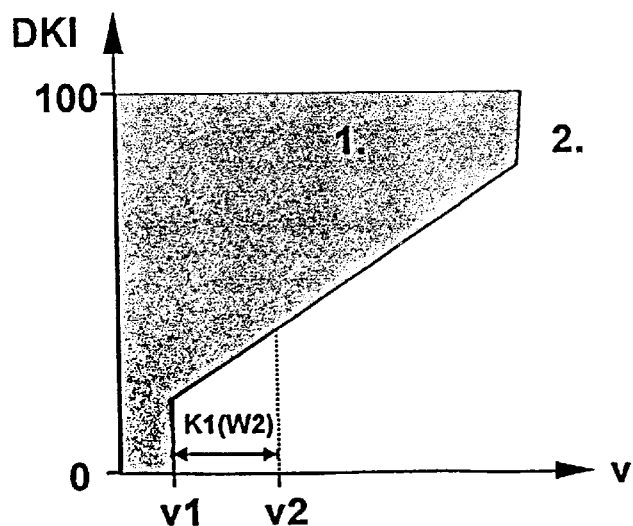
FIG. 4 is a shift characteristic field with a downshift characteristic line.

FIG. 4 shows a reduced shift characteristic field. Such a shift characteristic field usually has several upshift and downshift characteristic lines. For better viewing FIG. 4 shows only one downshift characteristic line, specifically, from second to first gear. Input variables for such a shift characteristic field are the vehicle speed (v) and the value of the throttle valve position DKI. DKI=0 thus means a completely closed throttle valve, i.e. the driver hag not actuated the accelerator pedal. For this case, FIG. 4 shows a first driving speed value v1. This corresponds to an original downshift point RS(ORG) in the non-activated downshift function. The value v2 on the abscissa results from the original downshift point RS(ORG) and the value K1(W2) calculated according to FIGS. 2 and 3; i.e. the downshift would thus occur at the higher vehicle speed v2.

The sequence of the process is the following:

If the driver actuates the brake pedal, there is retained the value of the torque reserve MM(RES) last shown from the actual engine torque, made available by the electronic motor control unit and the resistance torques detected in the electronic transmission control. Via the characteristic field of FIG. 2 is then determined the imaginary gradient of the transmission output rotational speed 16 and a conversion factor via a calculation formula. The calculation result is brake pressure pBR. By means of the brake pressure pBR and a calculated driving activity FA, a characteristic value K1 is then determined according to the characteristic field of FIG. 3. The downshift point for the value DKI=0 is then moved, depending on the characteristic value K1, to higher vehicle speeds v, i.e. the downshift occurs at an earlier time. The motor braking action is used. After a downshift has been carried out, whether another downshift is required or whether an end of the downshift function has been detected is tested. In case a brake pressure sensor is already available on the vehicle side, the results of the inventive solution can be used as an input variable pBR for the second characteristic field, i.e. FIG. 3. A calculation is omitted, according to FIG. 2.

Figure 5:
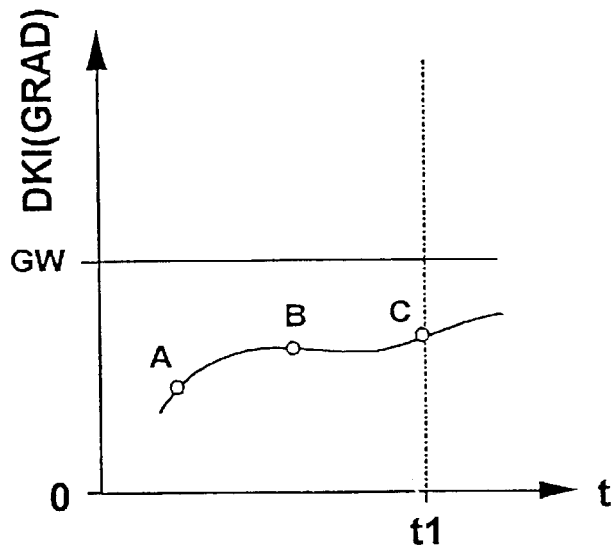
FIG. 5 is a time diagram function end, first case example.

In FIG. 5 is shown in a first case example, a time diagram for the end of the downshift function. On the ordinate is plotted the gradient of the throttle valve DKI(GRAD). Parallel with the abscissa is plotted a limit value line GW. The curve path with the points A, B and C represents the measured, positive curve of the DKI gradient. In this first case example, the curve of the DKI gradient remains below the limit value GW. At time t=0, the driver releases the brake pedal BR=0. It is further assumed that the throttle valve information DKI is above a minimum value MIN. The minimum value is determined by the traction-push characteristic line. If both conditions have been satisfied, the first delay time t1 is started. If this has expired, the downshift function terminates. According to FIG. 5, this is the case at time t1 at point C. The final criterion thus reads in this case: BR=0 and DKI> minimum value from traction-push characteristic line and t1=0.

Figure 6:
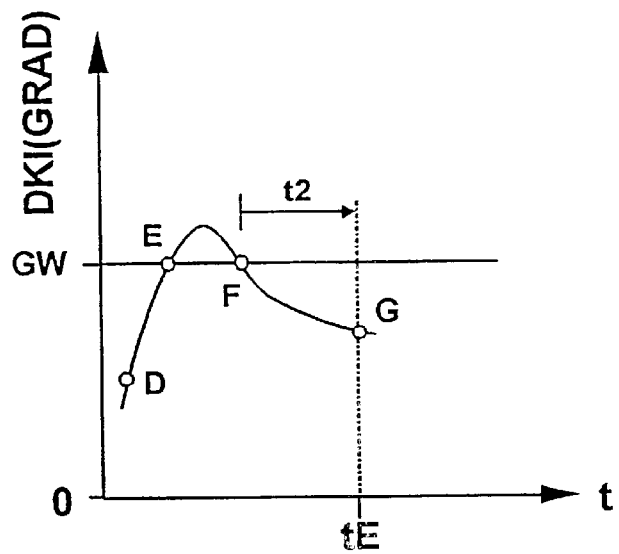
FIG. 6 is a time diagram function end, second case example.

A second example for the end of the downshift function is shown in FIG. 6. The measured DKI gradient (DKI (GRAD) is represented by the curve path with the points D, E, F and G. Such a curve occurs in practice, e.g. when at the end of a downhill gradient, the driver quickly actuates the accelerator pedal and then holds it constant. At point E, the DKI gradient exceeds the limit value line GW. If it again falls below the limit line GW, i.e. at point F, a second delay time t2 is started. In this example, the DKI gradient thereafter remains below the limit value line GW. With the expiration of the delay time t2, i.e. at time tE at point G, the downshift function terminates. The end criterion is therefore t2=0 and DKI gradient<GW.

Figure 7:
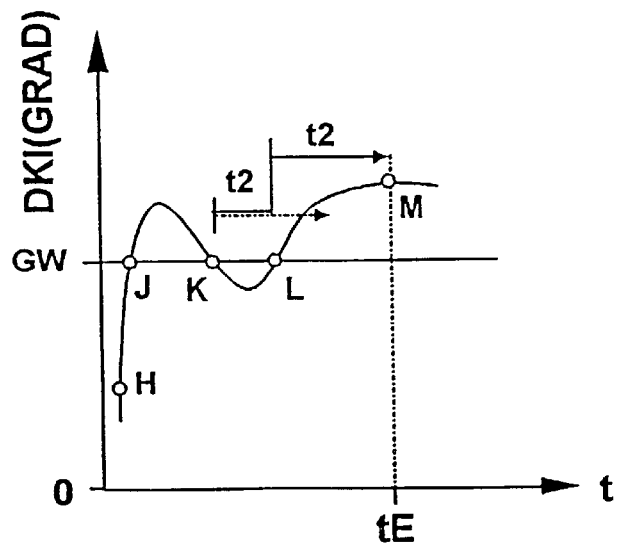
FIG. 7 is a time diagram function end, third case example.

FIG. 7 shows a third case example for the end of the downshift function. The basis used here was a DKI gradient curve with the points H to M. As already stated in FIG. 6, the second delay time t2 is started when the DKI gradient falls below the limit value line GW, i.e. at point K here. Thereafter the driver again actuates the accelerator pedal so that at point L the DKI gradient again exceeds the limit value line GW, In this example, when exceeding the limit value line GW, i.e. at point L, the second delay time t2 is restarted. The function then ends with the expiration of time step t2, i.e. at time tE. In this case, the function end is independent of the further curve of the DKI gradient.

Figure 8:
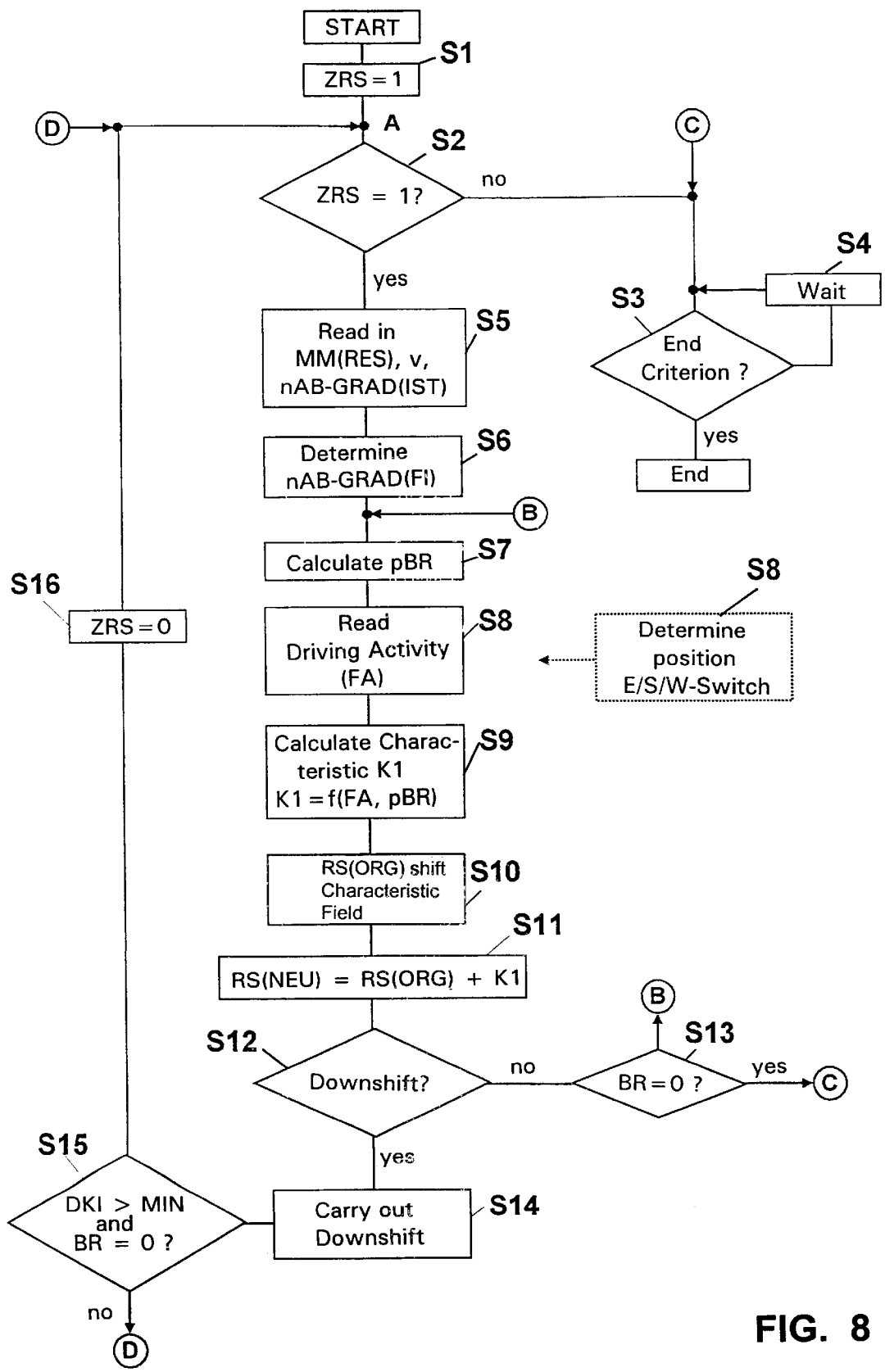
FIG. 8 is a program flow chart.

A program flow chart of the inventive process is shown in FIG. 8. The function is initiated when the driver actuates the brake pedal BR=1. In step S1 is thus activated the downshift function ZRS. Step S2 questions whether the downshift function is activated. If this is not the case, step S3 questions whether an end criterion has been detected. If the result of the question is positive in step S2, i.e. the downshift function ZRS is activated, there are read in step S5 the actual values of the torque reserve MM(RES), the vehicle speed (v) and the actual gradient nAB-GRAD(IST) determined from the transmission output rotational speed 16. The variables are constantly detected by the electronic transmission control during the operation. In step S6, the imaginary gradient of the transmission output rotational speed nAB-GRAD(FI) is established from the torque reserve MM(RES) and the vehicle speed (v) via the first characteristic field in FIG. 2. In step S7, from the imaginary and the actual gradients of the transmission output rotational speed, the brake pressure pBR is calculated according to the following formula:

$$pBR=K((nAB\text{-}GRAD(FI)-(nAB\text{-}GRAD(IST)))$$

K: conversion factor;

nAB-GRAD(FI): imaginary gradient of the transmission output rotational speed;

nAB-GRAD(IST): actual gradient of the transmission output rotational speed.

In step S8, the actual value of the driving activity is read in. In the new generation of automatic transmissions with an intelligent shift program, since the shift points are established depending on a previously calculated driving activity FA, the value FA can therefore be used. In step S9, the characteristic value K1 is then calculated via the second characteristic field of FIG. 3. In step S10, the downshift point RS(ORG) is found from the shift characteristic field. In FIG. 4, this corresponds to the point with the abscissa value v1 and to the ordinate value DKI=0. Step S11 then determines the new downshift point RS(NEU) by summing the original downshift point RS(ORG) and the characteristic value K1. According to FIG. 4, this corresponds to the abscissa value v2. Step S12 questions whether a downshift characteristic line has been exceeded. If this is not the case, then step S13 tests whether the driver has released the brake, BR=0. If the result of the test in step S13 is that the driver has kept the brake constantly actuated, the program branches off to point B and thereafter continues with step S7. If the result of the test in step S13 is that the driver has released the accelerator pedal, the program branches off to point C and, thereafter, continues with step S3. If the result of the question in step S12 is positive, i.e. a downshift characteristic line has been exceeded, the downshift is carried out with step S14. Thereafter, step S15 questions whether DKI is more than a minimum value and the brake pedal has been released. The minimum value is determined from a traction-push characteristic line. In step S15, if the question has not been satisfied, the program branches off to point D and, thereafter continues with step S2. If the result of the question is positive in step S15, the downshift function ZRS is reset in step S16. Thereafter the program continues with step S2. If the result of the test in step S2 is that the downshift function is inactive, step S3 questions whether an end criterion has been detected. If this is not the case, a holding pattern is passed through in step S4. If the end criterion is detected in question S3, the program flow chart is terminated.

In step S8, an alternative is shown as a dotted line function block with reference numeral S8'. The variant recommends itself for automatic transmissions which have not available any intelligent shift program but only a program selector switch. Such a program selector switch usually has the three positions economy "E", sport "S", and winter "W". The characteristic value K1 according to the alternative shown in FIG. 3 is calculated for this case.

REFERENCE NUMERALS 1 internal combustion engine
2 input shaft
3 automatic transmission
4 electronic transmission control
5 micro-controller
6 function block control actuators
7 memory
8 function block calculation speed
9 data line
10 electronic motor control unit
11 control line
12 control line
13 throttle valve information
14 brake pedal
15 input variables
16 transmission output rotational speeed

What is claimed is:

1. A process for control of an automatic transmission (3) in which the actuation of a brake pedal (BR=1) initiates a downshift function (ZRS=1), wherein at the initiation of the function (ZRS=1), an electronic transmission control (4) calculates a new downshift point (RS(NEU)) with closed throttle valve (DKI=0) by adding to a basic downshift point (RS(ORG)) a characteristic value (K1) (RS(NEU)=RS (ORG)+K1), wherein the basic downshift point is determined from a shift characteristic field (SKF) by which are shifted the gear steps (i,i=1, 2 . . . n) of said automatic transmission (3) depending on vehicle speed (v) and throttle valve position (DKI) (SKF=f(v, DKI) and determining the characteristic value (K1) from a driving activity (FA) and a calculated brake pressure (pBR) via a characteristic field (K1=f(FA, Pbr)).

2. The process according to claim 1, wherein the brake pressure (pBR) is determined from an actual gradient (nAB-GRAD(IST)) of a transmission output rotational speed (16) and an imaginary gradient of the transmission output rotational speed (nAB-GRAD(FI)) (pBR=K((nAB-GRAD(FI))−(nAB-GRAD(IST)))), (K) designates here a conversion factor and the imaginary gradient of the transmission output rotational speed (nAR-GRAD(FI)) is determined via a characteristic field, the latter representing a function of the vehicle speed (v) and a torque reserve (MM(RES)) nAB-GRAD(FI)=f(v, MM(RES))).

3. The process according to claim 2, wherein the torque reserve (MM(RES)) is determined from the torque (MM) generated by the internal combustion engine and the resistance torques (M(WI)).

4. The process according to claim 1, wherein the downshift function terminates (ZRS=0) when the following conditions have been satisfied:

release of the brake pedal (BR=0);

throttle valve value (DKI) is more than a minimum value (MIN) wherein the minimum value is determined via a traction-push characteristic line; and a first delay time (t1) has expired, it having been started with the release of the brake pedal (BR=0).

5. The process according to claim 4, wherein in case of a significant change of the throttle valve signal (DKI(GRAD) >limit value) during the first delay time (t1), a second delay time (t2) is started when the significant change no longer exists (DKI(GRAD)<limit value) and the downshift function terminates after expiration of the second delay time (t2=0).

6. The process according to claim 5, wherein in case of a repeated significant change of the throttle valve (DKI (GRAD)>GW) during the second delay time (t2), the latter is again started and the downshift function terminates independently of the further curve of the throttle valve when the second delay time has expired (t2=0).

* * * * *